United States Patent
van Hassel

(10) Patent No.: US 12,466,304 B2
(45) Date of Patent: Nov. 11, 2025

(54) TRANSPORT REFRIGERATION UNIT WITH HEAT ISLAND MITIGATION

(71) Applicant: Carrier Corporation, Palm Beach Gardens, FL (US)

(72) Inventor: Bart van Hassel, Weatogue, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 211 days.

(21) Appl. No.: 18/346,300

(22) Filed: Jul. 3, 2023

(65) Prior Publication Data

US 2024/0010116 A1     Jan. 11, 2024

Related U.S. Application Data

(60) Provisional application No. 63/367,671, filed on Jul. 5, 2022.

(51) Int. Cl.
*B60P 3/20* (2006.01)
*B60H 1/00* (2006.01)

(52) U.S. Cl.
CPC ............ *B60P 3/20* (2013.01); *B60H 1/00014* (2013.01); *B60H 1/00785* (2013.01)

(58) Field of Classification Search
CPC ... B60P 3/20; B60H 1/00014; B60H 1/00785; B60H 1/00385; B60H 2001/3289; H01M 8/06; H01M 2250/20
See application file for complete search history.

(56) References Cited

U.S. PATENT DOCUMENTS

| | | | |
|---|---|---|---|
| 4,266,406 A | 5/1981 | Ellis | |
| 5,074,121 A | 12/1991 | Morris | |
| 6,318,108 B1 | 11/2001 | Holstein et al. | |
| 7,013,658 B2 | 3/2006 | Dobmeier et al. | |
| 7,063,906 B2 | 6/2006 | Matthews et al. | |
| 8,652,695 B2 | 2/2014 | Saito et al. | |
| 9,021,824 B2 | 5/2015 | Koo et al. | |
| 9,466,846 B2 | 10/2016 | Shim et al. | |
| 9,765,987 B2 | 9/2017 | Grabon | |

(Continued)

FOREIGN PATENT DOCUMENTS

| | | |
|---|---|---|
| CN | 201218624 Y | 4/2009 |
| CN | 201779816 U | 3/2011 |

(Continued)

OTHER PUBLICATIONS

Extended European Search Report received for EP Application No. 23183165.2, mailed on Jan. 12, 2023, 7 Pages.

*Primary Examiner* — Emmanuel E Duke
(74) *Attorney, Agent, or Firm* — Drew Folgmann

(57) ABSTRACT

Disclosed is a transportation refrigeration system including a transportation refrigeration unit configured to maintain a temperature in a refrigerated cargo space and comprising a refrigerant expansion device, a refrigerant heat absorption heat exchanger, a refrigerant compression device, and a refrigerant heat rejection heat exchanger; and a refrigeration augmentation unit comprising a water tank having an outlet, and a water droplet generator in fluid communication with a water tank outlet and configured to disperse water droplets into an air stream flowing to the refrigerant heat rejection heat exchanger. Also disclosed are methods of using the transportation refrigeration system.

20 Claims, 4 Drawing Sheets

(56) References Cited

U.S. PATENT DOCUMENTS

| | | | |
|---|---|---|---|
| 9,774,046 | B2 | 9/2017 | Sanderson et al. |
| 10,411,275 | B2 | 9/2019 | Kwon |
| 11,211,619 | B2 | 12/2021 | Martuscelli et al. |
| 2004/0055324 | A1 | 3/2004 | Gupta |
| 2009/0123795 | A1 | 5/2009 | Chuah et al. |
| 2009/0139258 | A1* | 6/2009 | Hortin ............... F25C 5/22 |
| | | | 222/144.5 |
| 2010/0196775 | A1 | 8/2010 | Wu et al. |
| 2010/0307176 | A1 | 12/2010 | Zeweke et al. |
| 2013/0061615 | A1 | 3/2013 | Omer |
| 2021/0308507 | A1* | 10/2021 | Johnson ............ A62C 3/0264 |
| 2022/0133932 | A1 | 5/2022 | Baeg et al. |

FOREIGN PATENT DOCUMENTS

| | | | | |
|---|---|---|---|---|
| CN | 104613575 | A | | 5/2015 |
| CN | 105453320 | A * | 3/2016 | ........ H01M 8/04029 |
| CN | 112313763 | A * | 2/2021 | ......... B60H 1/00271 |
| EP | 3705324 | A1 | | 9/2020 |
| JP | 3-7613 | A | | 1/1991 |
| JP | H0740732 | A | | 2/1995 |
| JP | H11230640 | A * | 8/1999 | ........ F25B 2339/041 |
| JP | 2001043883 | A * | 2/2001 | ............. Y02E 60/50 |
| JP | 3632669 | B2 | | 3/2005 |
| JP | 2011052939 | A * | 3/2011 | |
| KR | 20050074748 | A * | 7/2005 | |
| KR | 10-2016-0026212 | A | | 3/2016 |
| NL | 9001872 | A * | 3/1991 | ............... F01P 3/22 |
| WO | 2013087995 | A1 | | 6/2013 |

\* cited by examiner

TRANSPORT REFRIGERATION UNIT WITH HEAT ISLAND MITIGATION

CROSS REFERENCE TO RELATED APPLICATIONS

This application claims the benefit of U.S. Provisional Patent Application No. 63/367,671 filed on Jul. 5, 2022, which is incorporated by reference herein in its entirety.

BACKGROUND

The embodiments herein generally relate to transport refrigeration.

Refrigerated vehicles, containers and trailers are commonly used to transport perishable goods. A transport refrigeration unit is commonly mounted to the vehicle, container, or to the trailer in operative association with a cargo space defined within the vehicle, container or trailer for maintaining one or more controlled temperature environments within the cargo space.

Conventionally, transport refrigeration units used in connection with refrigerated vehicles and refrigerated trailers include a refrigerant compressor, a condenser with one or more associated condenser fans, an expansion device, and one or more evaporators with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space. In cases where there are multiple compartments, each compartment may have an evaporator and an associated evaporator fan.

Heat from a truck connected to the refrigerated trailer or container can make the area between the truck and refrigerated trailer or container approximately 10° C. or more higher than the ambient environment. Given the fact that the condenser is typically located in this area, the increased temperature of this area (typically referred to as a heat island) makes the transfer of heat from the refrigerant in the condenser to the surrounding air more difficult. Improved methods of transferring heat from the refrigerant in the condenser are desired.

BRIEF DESCRIPTION

Disclosed herein is a transportation refrigeration system including: a transportation refrigeration unit configured to maintain a temperature in a refrigerated cargo space and comprising a refrigerant expansion device, a refrigerant heat absorption heat exchanger, a refrigerant compression device, and a refrigerant heat rejection heat exchanger; and a refrigeration augmentation unit comprising a water tank having an outlet, and a water droplet generator in fluid communication with a water tank outlet and configured to disperse water droplets into an air stream flowing to the refrigerant heat rejection heat exchanger.

In addition to one or more of the features described above, or as an alternative, further embodiments may include a fuel cell having an exhaust gas outlet in fluid communication with the water tank.

In addition to one or more of the features described above, or as an alternative, further embodiments may include a refrigeration augmentation unit which is removable.

In addition to one or more of the features described above, or as an alternative, further embodiments may include a deionizer disposed between the water tank and the water droplet generator.

In addition to one or more of the features described above, or as an alternative, further embodiments may include the refrigeration augmentation unit including an antimicrobial material.

In addition to one or more of the features described above, or as an alternative, further embodiments may include the water tank having an inlet connected to an exhaust gas outlet of a fuel cell that is part of a propulsion motor.

In addition to one or more of the features described above, or as an alternative, further embodiments may include the transportation refrigeration unit located in a heat island.

Also disclosed herein is a transportation refrigeration system including a transportation refrigeration unit configured to maintain a temperature in a refrigerated cargo space and comprising a refrigerant expansion device, refrigerant heat absorption heat exchanger, a refrigerant compression device, and a refrigerant heat rejection heat exchanger; a refrigeration augmentation unit comprising a water tank having an inlet, an outlet, a water droplet generator in fluid communication with the water tank outlet and configured to disperse water droplets into an air stream flowing to the refrigerant heat rejection heat exchanger; and a controller which controls the operation of the refrigeration augmentation unit based on ambient conditions and transportation refrigeration system conditions to disperse water droplets in a quantity and size that will result in evaporation of greater than or equal to 75% of the water droplets evaporate before contact with the refrigerant heat rejection heat exchanger.

In addition to one or more of the features described above, or as an alternative, further embodiments may include a fuel cell having an exhaust gas outlet in fluid communication with the inlet of the water tank.

In addition to one or more of the features described above, or as an alternative, further embodiments may include a deionizer disposed between the water tank and the spray nozzle.

In addition to one or more of the features described above, or as an alternative, further embodiments may include the refrigeration augmentation unit further including an antimicrobial material.

In addition to one or more of the features described above, or as an alternative, further embodiments may include the water tank having an inlet connected to an exhaust gas of a fuel cell located as part of a propulsion motor.

In addition to one or more of the features described above, or as an alternative, further embodiments may include the controller configured control operation such that greater than or equal to 90% of the water droplets evaporate before contact with the refrigerant heat rejection heat exchanger.

In addition to one or more of the features described above, or as an alternative, the water droplet generator includes an ultrasonic droplet generator.

Also disclosed is a method of cooling a refrigerated cargo space including: cycling a transportation refrigeration system on and off for a specified number of times wherein the transportation refrigeration system has a fuel cell, a controller, and a refrigeration augmentation unit and cycling is without using the refrigeration augmentation unit; and collecting water from the fuel cell during the transportation refrigeration system cycling without using the refrigeration augmentation unit; and cycling the transportation refrigeration system using the refrigeration augmentation unit, wherein water used by the refrigeration augmentation unit is the collected water.

In addition to one or more of the features described above, or as an alternative, water is also collected from a propulsion motor fuel cell.

In addition to one or more of the features described above, or as an alternative, water is also collected from a refrigerant heat absorption heat exchanger.

In addition to one or more of the features described above, or as an alternative, the controller controls the operation of the refrigeration augmentation unit based on ambient conditions and transportation refrigeration system conditions to disperse water droplets in a quantity and size that will result in evaporation of greater than or equal to 75% of the water droplets evaporate before contact with the refrigerant heat rejection heat exchanger.

In addition to one or more of the features described above, or as an alternative, the transportation refrigeration system is located in a heat island.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
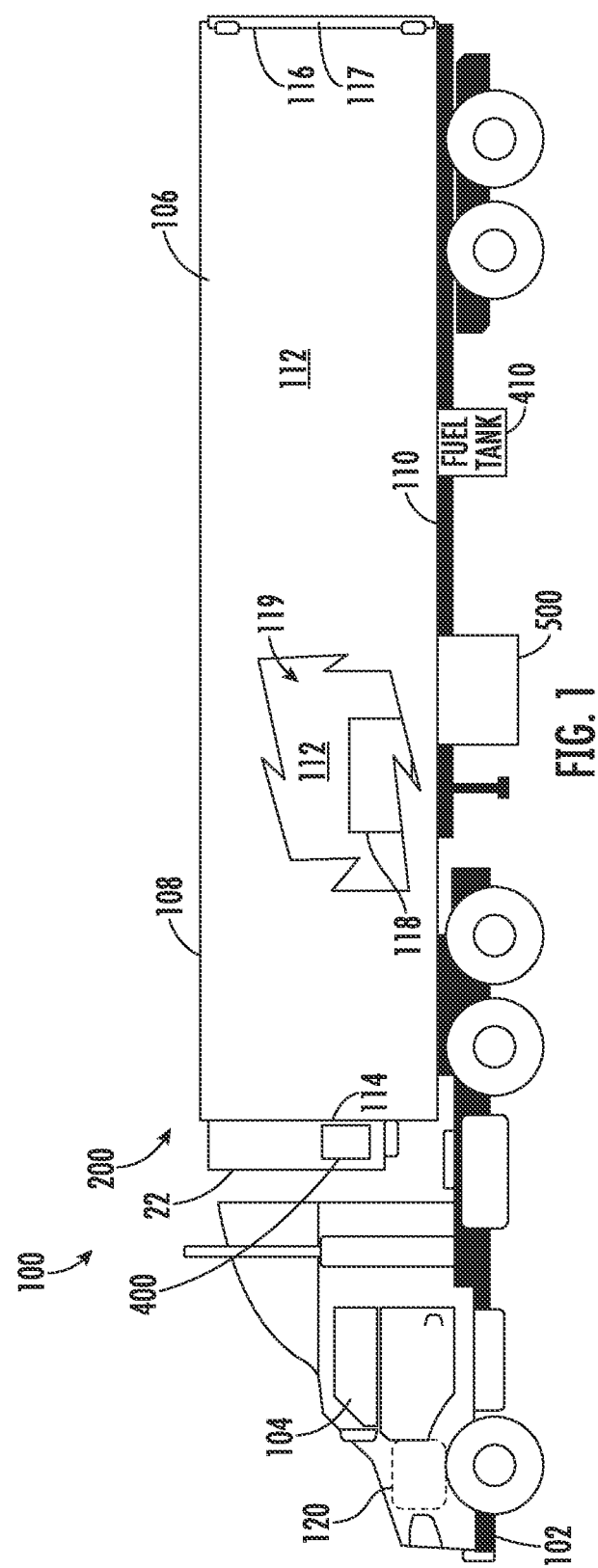
FIG. 1 shows a schematic illustration of a transport refrigeration system 200.

A detailed description of one or more embodiments of the disclosed apparatus and method are presented herein by way of exemplification and not limitation with reference to the Figures.

On many commercially available transport refrigeration units the compressor, and typically other components of the transport refrigeration unit, is powered during transit by a prime mover, either through a direct mechanical coupling or a belt drive. Alternatively, the transport refrigeration unit may be electrically powered (e.g., using an alternating current (AC) synchronous generator that generates AC power). The generated AC power is typically used to power an electric motor for driving the refrigerant compressor, and other components of the transport refrigeration unit. In a different electrically powered transport refrigeration unit, the AC generator may be replaced with a battery pack to provide power to the loads. Alternatively, a fuel cell may provide power to the loads. In each of these cases, the condenser of the transport refrigeration unit is typically located on the outside wall of the trailer in the area between the trailer and the truck. This area has temperatures that may be greater than or equal to 10° C. higher than the ambient outdoor temperature, creating a heat island and making heat transfer from the refrigerant to the ambient outdoor less energetically favorable, decreasing the efficiency of the refrigeration unit as a whole.

Improved heat transfer at the condenser can be achieved by incorporating evaporative cooling at the refrigerant heat rejection heat exchanger (condenser). Water droplets are sprayed onto the refrigerant heat rejection heat exchanger or into the air directly adjacent to the refrigerant heat rejection heat exchanger. Most or all of the water evaporates, and the phase change decreases the air temperature. The lower temperature air can accept more heat than the higher temperature air which increases the amount of heat that can be removed from the refrigerant in the refrigerant heat rejection heat exchanger. Stated another way, the resulting increase in the temperature difference between the condenser and the air flowing across the condenser results in an increase in the heat transfer rate. With increased heat transfer rate, the energy efficiency of the system overall is improved. In cases where a prime mover, generator or battery provides power to the transportation refrigeration unit, water may be provided from an externally filled tank, collected from the refrigerant heat absorption heat exchanger(s) (evaporator(s)) or both. In cases where a fuel cell system provides power to the transportation refrigeration unit, water may be provided by the exhaust gas of the fuel cell system optionally in combination with water collected from the refrigerant heat absorption heat exchanger, for example when water is collected during a defrost operation(s). It is further contemplated that in some embodiments, a truck and trailer combination may include a truck using a fuel cell system as a power source and water from the exhaust gas of the truck fuel cell system may provide water to the refrigerant heat rejection heat exchanger water spray.

Figure 2:
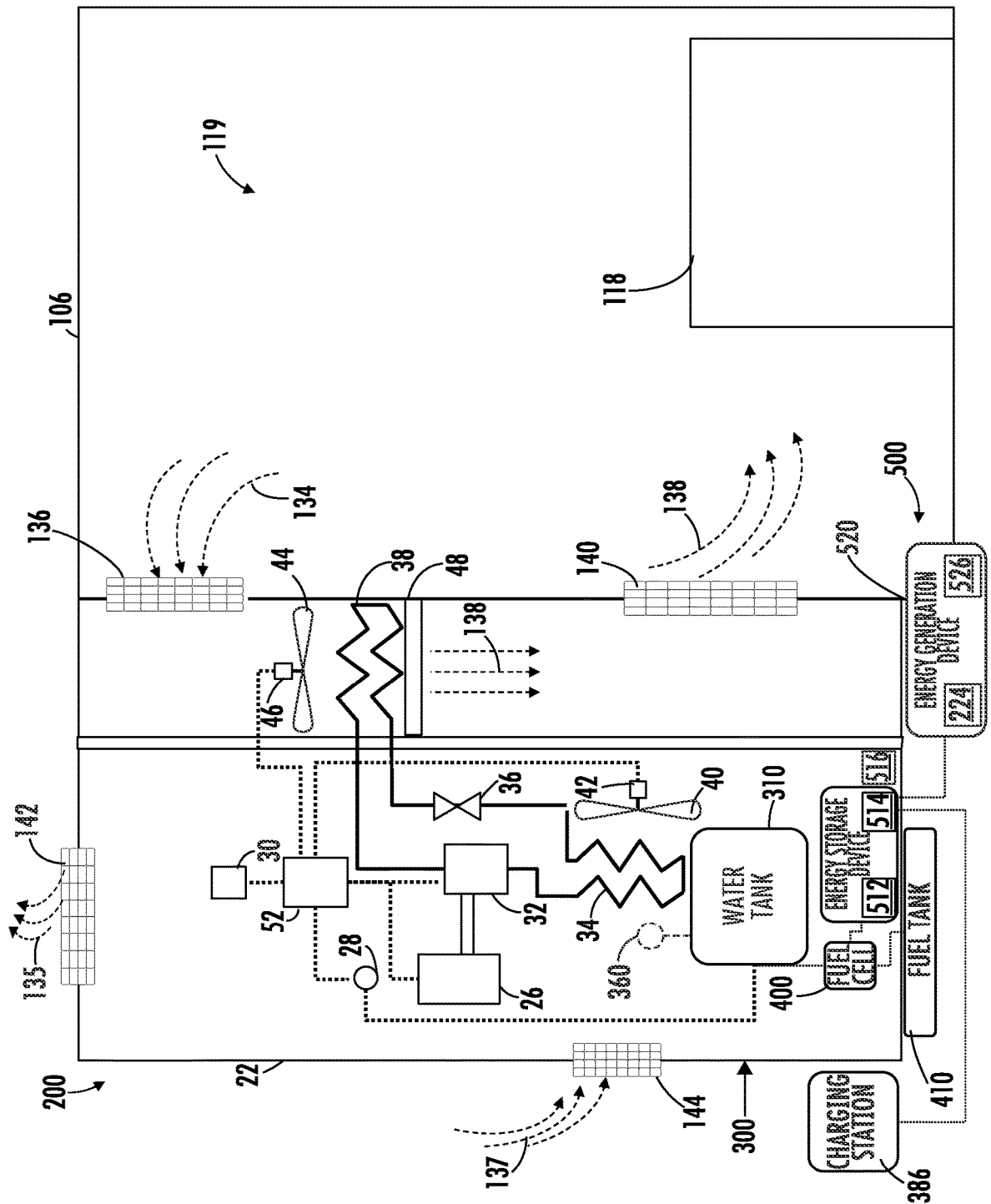
FIG. 2 shows an enlarged schematic illustration of the transport refrigeration system 200 of FIG. 1.

Referring to FIGS. 1 and 2, various embodiments of the present disclosure are illustrated. FIG. 1 shows a schematic illustration of a transport refrigeration system 200. FIG. 2 shows an enlarged schematic illustration of the transport refrigeration system 200 of FIG. 1.

The transport refrigeration system 200 is being illustrated as a trailer system 100, as seen in FIG. 1. The trailer system 100 includes a vehicle 102 coupled to a transport container 106. The vehicle 102 may include an operator's compartment or cab 104 and a propulsion motor 120 which acts as the drive system of the trailer system 100. The propulsion motor 120 is configured to power the vehicle 102. The energy source that powers the propulsion motor 120 may be at least one of compressed natural gas, liquefied natural gas, gasoline, electricity, diesel, hydrogen, electricity from a fuel cell, electricity from a hydrogen fueled proton exchange membrane (PEM) fuel cell, electricity from a battery, electricity from a generator, or any combination thereof. The propulsion motor 120 may be an electric motor or a hybrid motor (e.g., a combustion engine and an electric motor). The transport container 106 may be removably coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transportation refrigeration unit 22 is located on the front wall 114, between the transport container 106 and the vehicle 102. This placement results in the transportation refrigeration unit being located in a heat island. Heat island, as used herein, describes an area or space in which has a temperature at least 5-10° C. higher than the ambient temperature. The transport container 106 further includes a door or doors 117 at a rear wall 116, opposite the front wall 114. Alternatively, door or doors 117 may be located on one or more side walls 112. It is further contemplated that door or doors 117 may be located on a combination of side wall(s) 112 and rear wall 116. The walls of the transport container 106 define a refrigerated cargo space 119. The refrigerated cargo space 119 may comprise multiple compartments which may have different desired conditions such as different temperatures. For simplicity, a single refrigerated cargo space 119 is referred to herein. It is appreciated by those of skill in the art that embodiments described herein may be applied to a tractor-trailer refrigerated system or non-trailer refrigeration such as, for example a rigid truck, a truck having refrigerated compartment, or a shipping container having a refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a transport refrigeration unit 22, a refrigerant compression device 32, an electric motor 26 for driving the refrigerant compression device 32, and a controller 30. While shown as a single controller, controller 30 may comprise one or more sub controllers (not shown) which are coordinated to control elements of the transport refrigeration system 200. The transport refrigeration unit 22 is in operative association with the refrigerated cargo space 119 and is configured to provide conditioned air to the transport container 106. The transport refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in the refrigerated cargo space 119, as known to one of ordinary skill in the art. In an embodiment, the transport refrigeration unit 22 is capable of providing a desired temperature, carbon dioxide, and humidity range.

The transport refrigeration unit 22 includes a refrigerant compression device 32, a refrigerant heat rejection heat exchanger (also referred to as a condenser) 34, an expansion device 36, and a refrigerant heat absorption heat exchanger (also referred to as an evaporator) 38 connected in refrigerant flow communication in a closed loop refrigerant circuit and arranged in a conventional refrigeration cycle. The transport refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The transport refrigeration unit 22 may also include a heater (not shown) associated with the refrigerant heat absorption heat exchanger 38. The heater may be an electric resistance heater. It is to be understood that other components (not shown) may be incorporated into the refrigerant circuit as desired, including for example, but not limited to, a suction modulation valve, a receiver, a filter/dryer, a sub cooler, and an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the transport refrigeration unit 22 is operating in a subcritical refrigerant cycle or as a refrigerant gas cooler, such as if the transport refrigeration unit 22 is operating in a transcritical cycle. A sub cooler, when present, receives refrigerant from the refrigerant heat rejection heat exchanger.

The refrigerant heat absorption heat exchanger 38 may, for example, also comprise one or more refrigerant conveying coiled tubes or one or more tube banks formed of a plurality of refrigerant conveying tubes extending across flow path from a return air intake 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat absorption heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the refrigerated cargo space 119 of the transport container 106 by means of the transport refrigeration unit 22. A return airflow 134 flows into the transport refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140.

Heat 135 is removed from the refrigerant heat rejection heat exchanger 34 through the heat outlet 142. The transport refrigeration unit 22 may contain an external air inlet 144, as shown in FIG. 2, to aid in the removal of heat 135 from the refrigerant heat rejection heat exchanger 34 by pulling in external air 137. The supply airflow 138 may cool the perishable goods 118 in the refrigerated cargo space 119 of the transport container 106.

It is to be appreciated that the transport refrigeration unit 22 can further be operated in reverse to warm the transport container 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the transport refrigeration unit 22.

The transport refrigeration system 200 also includes a controller 30 configured for controlling the operation of the transport refrigeration system 200 including, but not limited to, the operation of various components of the refrigerant unit 22 to provide and maintain a desired thermal environment within the refrigerated cargo space 119. The controller 30 may also be able to selectively operate the electric motor 26. The controller 30 may also be configured to provide a feedforward signal to the fuel cell 400 so that it will start up before the transport refrigeration unit 22 places a load on the fuel cell 400. As mentioned above, controller 30 may comprises one or more sub controllers.

The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium. The controller 30 may have multiple inputs (e.g. analog, digital, others) and multiple outputs and a communication interface (e.g. CAN-bus, ethernet). The controller may also have circuits to protect the controller from inductive loads. The communication interface may include an interface that allows data about the operation of the transport refrigeration system to be transmitted to a remote server (e.g., the cloud) for storage and/or analysis and which also can be used to receive instructions from a remote location e.g., a remote operator or a remote server. Exemplary instructions include initiating operation of the refrigeration augmentation unit and halting operation of the refrigeration augmentation unit.

The transport refrigeration system 200 also includes a refrigeration augmentation unit 300. Refrigeration augmentation unit includes a water tank 310 and a water droplet generator(s) 360 for dispersing water droplets into the air stream flowing to the refrigerant heat rejection exchanger 34, directly on the surface of the refrigerant heat rejection exchanger 34, or a combination thereof. In cases where the refrigerant heat rejection exchanger includes a sub cooler (not shown) the water droplets may be dispersed in the airstream flowing to the sub cooler, directly on the surface of the sub cooler, or a combination thereof. Exemplary water droplet generators include spray nozzles and ultrasonic droplet generators such as ultrasonication mist generators. Exemplary maximum droplet size is less than or equal to 100 micrometers (μm), or less than or equal to 50 μm.

The water droplet generator(s) may disperse the water droplets in any combination of orientations. In some embodiments, a combination of orientations is desired to facilitate mixing with the air flow and facilitate evaporation. Water droplet evaporation reduces the temperature of the air passing over the refrigerant heat rejection exchanger. By reducing the temperature of the air passing over the refrigerant heat rejection exchanger 34 the heat transfer rate from the refrigerant passing through the refrigerant heat rejection exchanger 34 can be increased. The water droplets are sized so that at least 75%, or at least 85%, or at least 90 volume % (vol %) of the droplets evaporate. As can be appreciated, the size of the droplets and the location where the water droplets are introduced (such as the distance from the refrigerant heat rejection heat exchanger or sub cooler) can be chosen in relation to the rate of air flow over the heat exchanger and water evaporation rate. The droplet size may be managed, in part, by the augmentation unit pressure. Augmentation unit pressure can be monitored and controlled by controller 30.

The refrigeration augmentation unit 300 may incorporate a deionizer and/or filter system (not shown) between water tank 310 and water droplet generator 360 in order to remove any undesirable ions and/or particulate matter from the water prior to forming and delivering the water droplets. Deionization may reduce or eliminate the deposition of undesirable materials on the heat rejection exchanger 34. Filtration can also prevent the deposition of undesirable materials on the heat rejection exchanger 34. Undesirable materials, such as metal salt deposits, may cause corrosion and reduce the ability of the heat rejection exchanger to facilitate heat transfer from the refrigerant to the passing air. Furthermore, undesirable materials can clog the water droplet generator 360, resulting in a system with reduced efficacy.

Additionally, the water tank 310 may include an antimicrobial material. Exemplary materials include a foam that provides a source of silver and/or copper ions to the water. The foam may be part of a cartridge or other device that allows for replenishment. Alternatively, the tank may be lined with a material that provides a source of silver or copper ions. Silver and copper ions can have an inhibitory effect on bacterial growth. It is also contemplated that water may be exposed to silver ions, copper ions, or both after leaving the water tank 310 but prior to being formed into droplets.

Water may be provided to the water tank 310 by one or more of the following sources: collected from the evaporator in collector 48, from the exhaust gas outlet of the fuel cell 400 (when present), filled from a source external to the transportation refrigeration system 200. While one water tank 310 is shown for simplicity, it should be noted that multiple collection/storage containers may be used. Sources external to the transportation refrigeration system include tap water and water collected from the exhaust gas of a fuel cell used as part of propulsion motor 120. It will be appreciated that water supplied by the collector 48 may be dependent on the humidity of the refrigerated space and it may be necessary to supplement with an additional source.

All or part of the refrigeration augmentation unit 300 may be modular and thus removable when desired due to climate conditions. For example, the water tank 310 may be removed, for example when the transport refrigeration system is going to be exposed to temperatures below 0° C. The water droplet generator 360 may also be removed. It is also contemplated that any residual water in the water tank 310 and/or water droplet generator may be removed using compressed air. The compressed air may be provided by an external source or on-board source as described below.

Water tank 310 may be pressurized by compressed air provided by fuel cell 400, when present, or other methods of pressurization. Alternatively, pressure to create the water droplets maybe provided by another source such as a pump, compressor, or both (not shown). As mentioned above, pressure may be managed by the controller 30. The flow rate to the water droplet generator may be up to 1.5 liters per minute and may be chosen based on environmental factors. For example, under conditions of high relative humidity the flow rate would be decreased in order to achieve evaporation of the majority of the water droplets and limit condensation on the refrigerant heat rejection heat exchanger and/or sub cooler. These considerations may be part of an algorithm used by the controller 30 to maximize the effect of evaporative cooling and the overall efficiency of the system.

The amount and/or presence of mist may be managed by the controller and used to provide an increase in cooling either prior to opening the doors to the refrigerated space, immediately following opening the doors to the refrigerated space, or both. In some embodiments the refrigeration augmentation unit may be operated to provide a cooling capacity boost after the doors to one or more compartments have been opened and closed. More specifically, the refrigeration augmentation unit may be used to boost the cooling capacity between access episodes when time between the access episodes is insufficient for the transport refrigeration system to reach a set point using the normal (non-augmented) cooling capacity of the system.

It is also contemplated that in situations in which the transport refrigeration unit 22 cycles between an "on" state and an "off" state, the refrigeration augmentation unit is operational for a portion of these cycles. For example, the transportation refrigeration unit completes a desired number of cycles, X. After X cycles the refrigeration augmentation unit generates water droplets to cool the air entering the refrigerant heat rejection heat exchanger. X may be chosen based on the size of the fuel cell 400 (described below) so that fuel cell 400 generates enough water to provide the majority (or all) of the water for water droplet generation.

The transport refrigeration unit 22 may be powered by a fuel cell 400 and/or an energy storage device 510. The fuel cell 400, associated fuel tanks 410, and energy storage device 510 may be attached to the trailer system 100. The fuel cell 400 may be located in transport refrigeration unit 22. Alternatively, the fuel cell 400, associated fuel tanks 410, and energy storage device 510 may be attached to a bottom of the trailer system 100. The fuel tanks 410 for the fuel cell 400 are understood by a person of skill in the art to be pressure vessels and the term "fuel tank" is not intended to refer to a diesel tank or a gasoline tank in this context.

The fuel cell 400 includes an anode electrode and a cathode electrode separated by an electrolyte (not shown for simplicity). A reducing fluid such as hydrogen is supplied to the anode electrode, and an oxidant such as oxygen or air is supplied to the cathode electrode. In a cell utilizing a PEM as the electrolyte, the hydrogen electrochemically reacts at a catalyst surface of the anode electrode to produce hydrogen ions and electrons. The electrons are conducted to an external load circuit (e.g., the transport refrigeration unit 22 or energy storage device 510) and then returned to the cathode electrode, while the hydrogen ions transfer through the electrolyte to the cathode electrode, where they react with the oxidant and electrons to produce water and release thermal energy. A fuel tank 410 is configured to store and provide the reducing fluid to the fuel cell 400. In an embodiment, the reducing fluid is hydrogen.

There may be one or more fuel cells 400 and one or more fuel tanks 410. In one embodiment, the fuel cell 400 may be located inside the transport refrigeration unit 22, as shown in FIG. 2. In another embodiment, the fuel cell 400 may be located outside of the transport refrigeration unit 22. The fuel cell 400 may be located under the transport container 106 of the trailer system 100.

In one embodiment, the fuel tank 410 may be located inside the transport refrigeration unit 22. In another embodiment, the fuel tank 410 may be located outside of the transport refrigeration unit 22. The fuel tank 410 may be located under the transport container 106 of the trailer system 100, as shown in FIG. 1.

In one embodiment, one or more supplemental power sources 500 may be located outside of the transport refrigeration unit 22, as shown in FIG. 1. In another embodiment, the one or more supplemental power sources 500 may be located within the transport refrigeration unit 22. The one or more supplemental power sources 500 may include an energy storage device, a thermal storage system, and/or an electric generation device. The fuel cell 400 may power the transport refrigeration unit 22 directly or may provide electricity to an energy storage device, which then provides power to the transport refrigeration unit 22.

The thermal storage system does not directly provide electricity to the transport refrigeration unit 22 but rather the thermal storage system may be used to save electricity used by the transport refrigeration unit 22 by providing supplemental or replacement heating or cooling to the transport container 106, and/or to a sub-cooler of the refrigerant in the refrigeration system. A thermal storage system may be present to sink electrical energy into to cool the transport container 106. The thermal storage system may utilize a phase change material to provide cooling to the transport container 106. For example, the thermal storage system may utilize electricity to change the phase change material from one phase to another phase to cool the transport container 106. The thermal storage system may be an ice generation system to create ice to cool the transport container 106. The ice generation system may generate ice when electricity is available or plentiful to provide lasting cooling for the transport container 106 to conserve electricity later by reducing use of the compression device 32 for cooling.

The energy storage device may include a battery system, a capacitor, and/or any other electricity storage system known to one of skill in the art. The battery system may comprise chemical batteries, lithium-ion batteries, solid state batteries, flow batteries, or any other type of battery known to one of skill in the art. The battery system may employ multiple batteries organized into battery banks. The capacitor may be an electrolytic capacitor, a mica capacitor, a paper capacitor a film capacitor, a non-polarized capacitor, a ceramic capacitor, or any type of capacitor known to one of skill in the art.

The electricity generated by the electric generation device may charge the energy storage device or directly power the transport refrigeration unit 22. The electric generation device may include an axle generator, hub generator, and/or any other electricity generation system known to one of skill in the art.

The energy storage device may be charged by a stationary charging station such as, for example a three-phase 460 Vac (60 Hz) or 400 Vac (50 Hz) power outlet. The charging station may provide single phase (e.g., level 2 charging capability) or three phase AC power to the energy storage device 510. It is understood that the charging station may have any phase charging and embodiments disclosed herein are not limited to single phase or three phase AC power.

The transport refrigeration unit 22 has a plurality of electrical power demand loads on the energy storage device 510, including, but not limited to, the electric motor 26 for the compression device 32, the drive motor 42 for the fan 40 associated with the refrigerant heat rejection heat exchanger 34, and the drive motor 46 for the fan 44 associated with the refrigerant heat absorption heat exchanger 38. As each of the fan motors 42, 46 and the electric motor 26 may be an AC motor or a DC motor, it is to be understood that various power converters 52, such as AC to DC rectifiers, DC to AC inverters, AC to AC voltage/frequency converters, DC to DC voltage converters, and filters, may be employed in connection with the energy storage device 150 as appropriate. In the depicted embodiment, the heater 48 also constitutes an electrical power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the refrigerant heat absorption heat exchanger 38. Additionally, the electric motor 26 being used to power the refrigerant compression device 32 constitutes a demand load. The refrigerant compression device 32 may comprise a single-stage or multiple-stage compressor such as, for example, a reciprocating compressor or a scroll compressor. The transport refrigeration system 200 may also include a voltage sensor 28 to sense the voltage and phase coming into the transport refrigeration unit 22. Additional power demand loads may include various controllers, battery chargers, stepper motor modules, display modules, power control modules, control box, refrigerant valves, coolant pumps, and any component of the transport refrigeration system 200 that may require power or accessories of 106, such as lift gate.

The power demand loads of the transport refrigeration unit 22 may be managed and fulfilled by an energy management system (not shown). The energy management system may include the fuel cell 400 and/or the one or more supplemental power sources 500. The energy management system may include a power management module that is in communication with transport refrigeration unit 22, the fuel cell 400 and/or the one or more supplemental power sources 500, and the fuel tank.

Figure 3A:
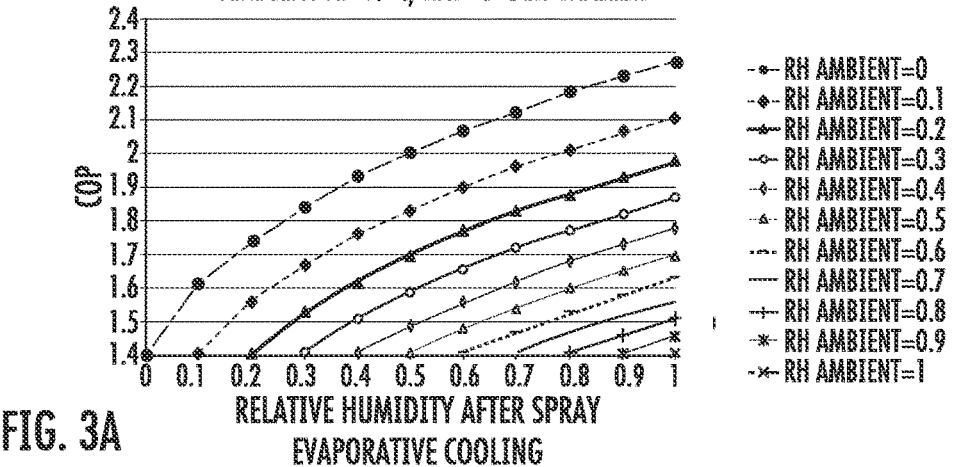
FIG. 3A-C are graphs of the effect of evaporative cooling on coefficient of performance, cooling capacity and power at an ambient temperature of 40° C., a return air temperature of 0° C., and a variety of ambient relative humidity values.
Figure 3B:
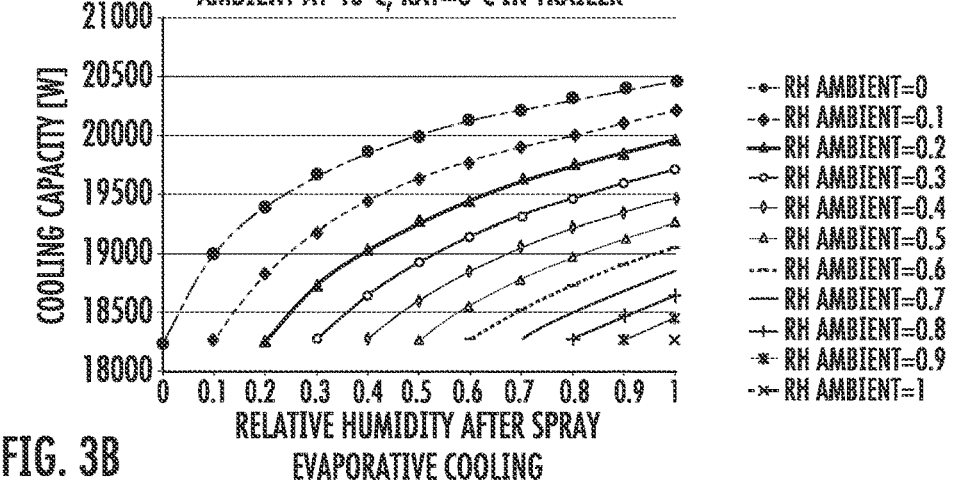
Figure 3C:
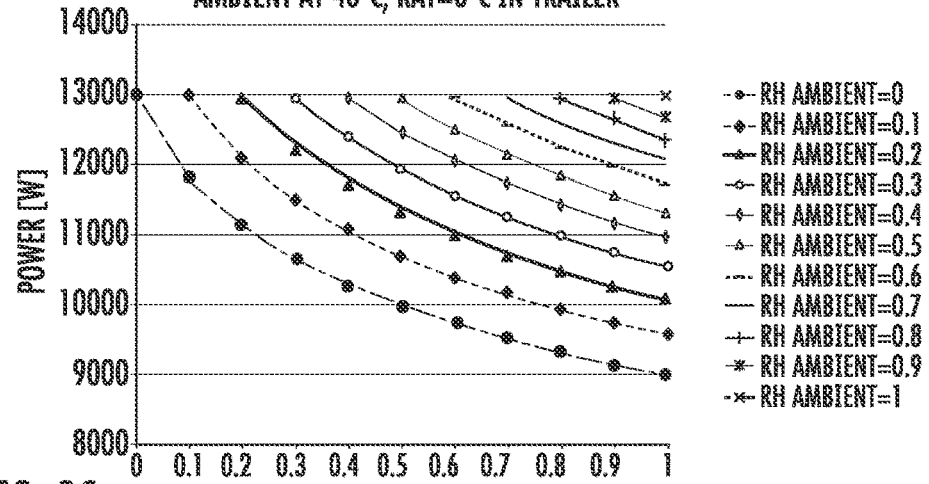
Figure 4A:
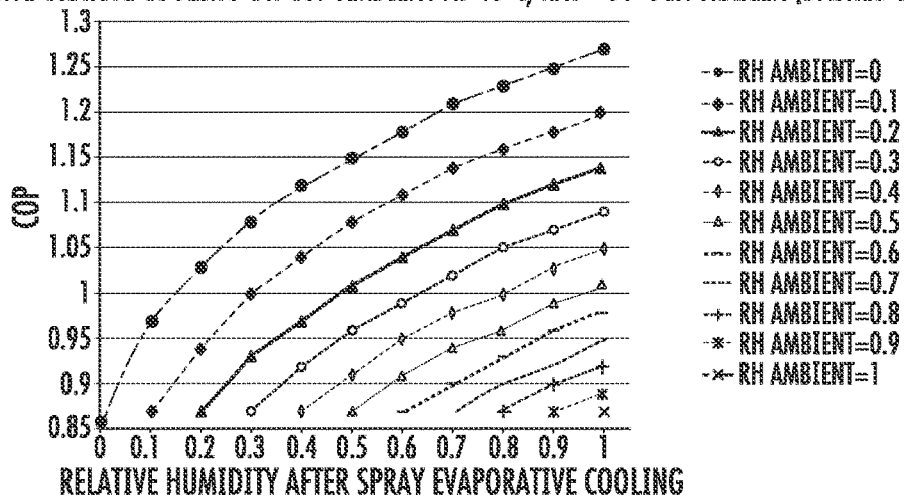
FIG. 4A-C are graphs of the effect of evaporative cooling on coefficient of performance, cooling capacity and power at ambient temperature of 40° C., a return air temperature of −30° C., and a variety of ambient relative humidity values.
Figure 4B:
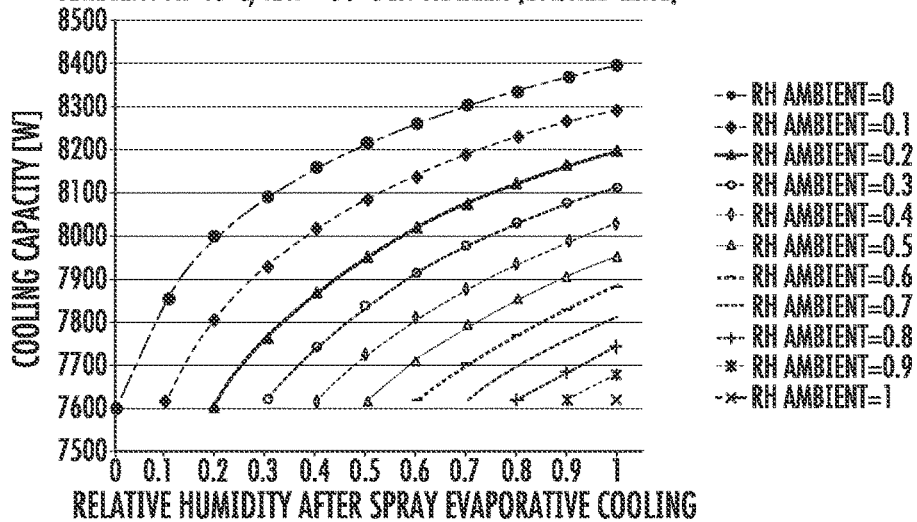
Figure 4C:
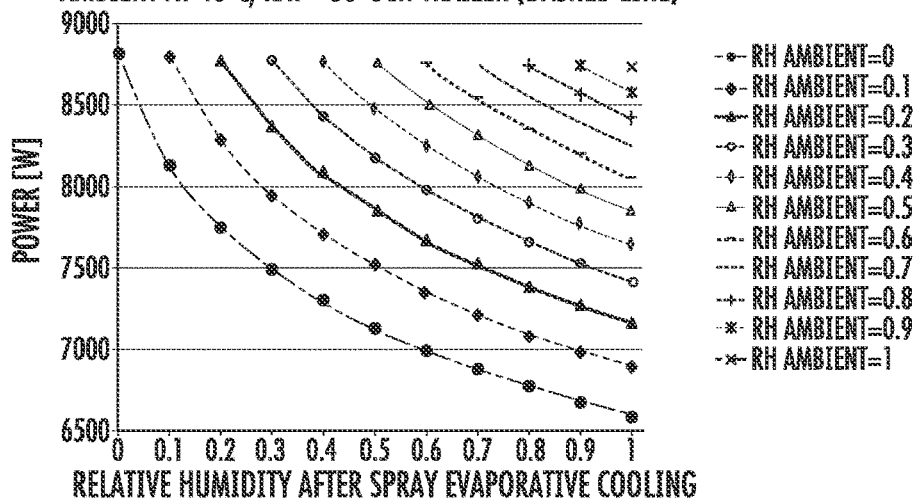

FIGS. 3A-C and FIGS. 4A-C show the effect of different amounts of evaporative cooling (indicated by the relative humidity after spray evaporative cooling) on the coefficient of performance (COP), cooling capacity, and power. FIGS. 3A-C show the effect at an ambient temperature of 40° C., a return air temperature of 0° C. in the conditioned space and a variety of ambient relative humidity values. FIGS. 4A-C show the effect of evaporative cooling at an ambient temperature of 40° C., a return air temperature of −30° C. in the conditioned space and a variety of ambient relative humidity values. FIGS. 3A-C and FIGS. 4A-C both show that evaporative cooling increases the COP and cooling capacity while simultaneously reducing the required power at all ambient relative humidity values less than 1 (less than 100% relative humidity). Additionally, the greater the relative humidity after evaporative cooling the greater the effect.

The transportation refrigeration system having a refrigeration augmentation unit 300 can generate more cooling capacity at less power when using the refrigeration augmentation unit. Accordingly, described herein is a method of cooling a refrigerated cargo space. The method includes cycling a transportation refrigeration system having a fuel cell and a refrigeration augmentation unit on and off for a specified number of times without using the refrigeration augmentation unit; collecting water from the fuel cell during the transportation refrigeration system cycling; and operating the transportation refrigeration system and the refrigeration augmentation unit using the collected water.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transportation refrigeration system comprising:
a transportation refrigeration unit configured to maintain a temperature in a refrigerated cargo space and comprising a refrigerant expansion device, a refrigerant heat absorption heat exchanger, a refrigerant compression device, and a refrigerant heat rejection heat exchanger; and
a refrigeration augmentation unit comprising a water tank having an outlet, and a water droplet generator in fluid communication with the outlet of the water tank and configured to disperse water droplets into an air stream flowing to the refrigerant heat rejection heat exchanger, wherein a size of the water droplets is selected based at least in part on a rate of the air stream flowing over the refrigerant heat rejection heat exchanger.

2. The transportation refrigeration system of claim 1, further comprising a fuel cell having an exhaust gas outlet in fluid communication with the water tank.

3. The transportation refrigeration system of claim 1, wherein the refrigeration augmentation unit is removable.

4. The transportation refrigeration system of claim 1, wherein the refrigeration augmentation unit further comprises a deionizer disposed between the water tank and the water droplet generator.

5. The transportation refrigeration system of claim 1, wherein the refrigeration augmentation unit further comprises an antimicrobial material.

6. The transportation refrigeration system of claim 1, wherein the water tank has an inlet connected to an exhaust gas outlet of a fuel cell that is part of a propulsion motor.

7. The transportation refrigeration system of claim 1, wherein the transportation refrigeration unit is located in a heat island.

8. The transportation refrigeration system of claim 1, wherein the size of the water droplets is selected further based at least in part on a water evaporation rate.

9. The transportation refrigeration system of claim 1, wherein a distance between the refrigerant heat rejection heat exchanger and a location of dispersing of the water droplets is selected based on at least one of the rate of the air stream flowing over the refrigerant heat rejection heat exchanger and a water evaporation rate.

10. The transportation refrigeration system of claim 1, wherein the size of the water droplets is less than or equal to 100 micrometers (μm).

11. A transportation refrigeration system comprising:
a transportation refrigeration unit configured to maintain a temperature in a refrigerated cargo space and comprising a refrigerant expansion device, refrigerant heat absorption heat exchanger, a refrigerant compression device, and a refrigerant heat rejection heat exchanger;

a refrigeration augmentation unit comprising a water tank having an inlet, an outlet, a water droplet generator in fluid communication with the water tank outlet and configured to disperse water droplets into an air stream flowing to the refrigerant heat rejection heat exchanger; and a controller which controls the operation of the refrigeration augmentation unit based on ambient conditions and transportation refrigeration system conditions to disperse water droplets in a quantity and size that will result in evaporation of greater than or equal to 75% of the water droplets evaporate before contact with the refrigerant heat rejection heat exchanger.

12. The transportation refrigeration system of claim 11, further comprising a fuel cell having an exhaust gas outlet in fluid communication with the inlet of the water tank.

13. The transportation refrigeration system of claim 11, wherein the refrigeration augmentation unit further comprises a deionizer disposed between the water tank and the water droplet generator.

14. The transportation refrigeration system of claim 11, wherein the water tank has an inlet connected to an exhaust gas of a fuel cell located as part of a propulsion motor.

15. The transportation refrigeration system of claim 11, wherein greater than or equal to 90% of the water droplets evaporate before contact with the refrigerant heat rejection heat exchanger.

16. The transportation refrigeration system of claim 11, wherein water droplet generator comprises an ultrasonic droplet generator.

17. A method of cooling a refrigerated cargo space comprising:

cycling a transportation refrigeration system having a fuel cell, a controller, and a refrigeration augmentation unit on and off for a number of times without using the refrigeration augmentation unit, wherein the number of times the transportation refrigeration system is cycled on and off is based at least in part on a size of the fuel cell; and collecting water from the fuel cell during the cycling of the transportation refrigeration system without using the refrigeration augmentation unit; and cycling the transportation refrigeration system using the refrigeration augmentation unit, wherein water used by the refrigeration augmentation unit comprises the collected water.

18. The method of cooling the refrigerated cargo space of claim 17, wherein water is also collected from a propulsion motor fuel cell.

19. The method of cooling the refrigerated cargo space of claim 17, wherein water is also collected from a refrigerant heat absorption heat exchanger.

20. The method of cooling the refrigerated cargo space of claim 17, wherein a controller controls the operation of the refrigeration augmentation unit based on ambient conditions and transportation refrigeration system conditions to disperse water droplets in a quantity and size that will result in evaporation of greater than or equal to 75% of the water droplets evaporate before contact with the refrigerant heat rejection heat exchanger.

* * * * *